April 2, 1968  D. H. FRANK  3,376,420
NEUTRON ACTIVATION SPECTROMETRY SYSTEM
Filed Aug. 10, 1964  2 Sheets-Sheet 1
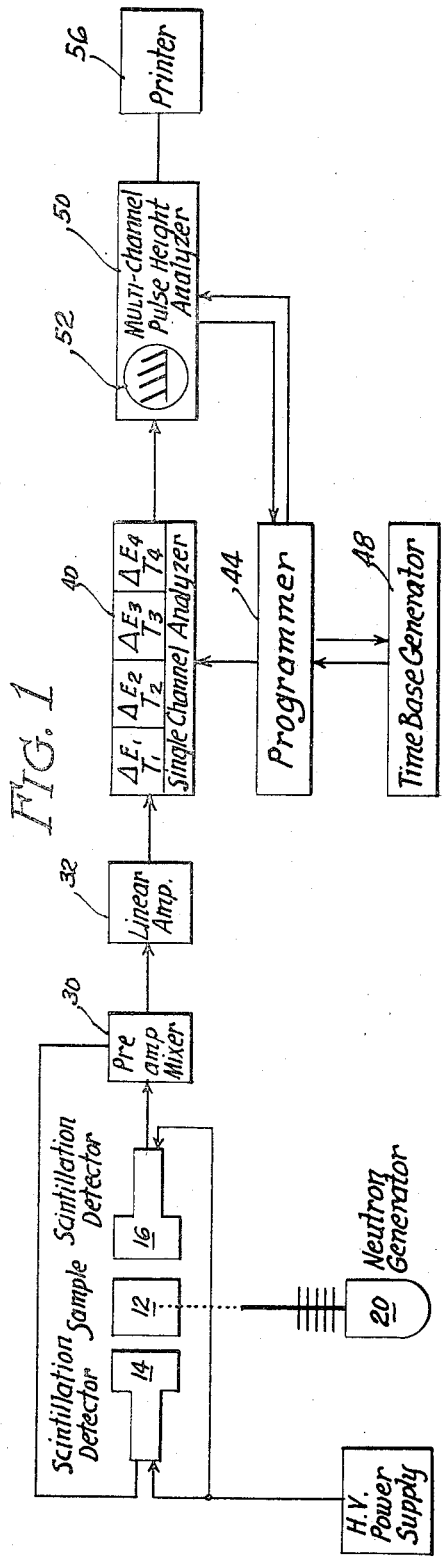
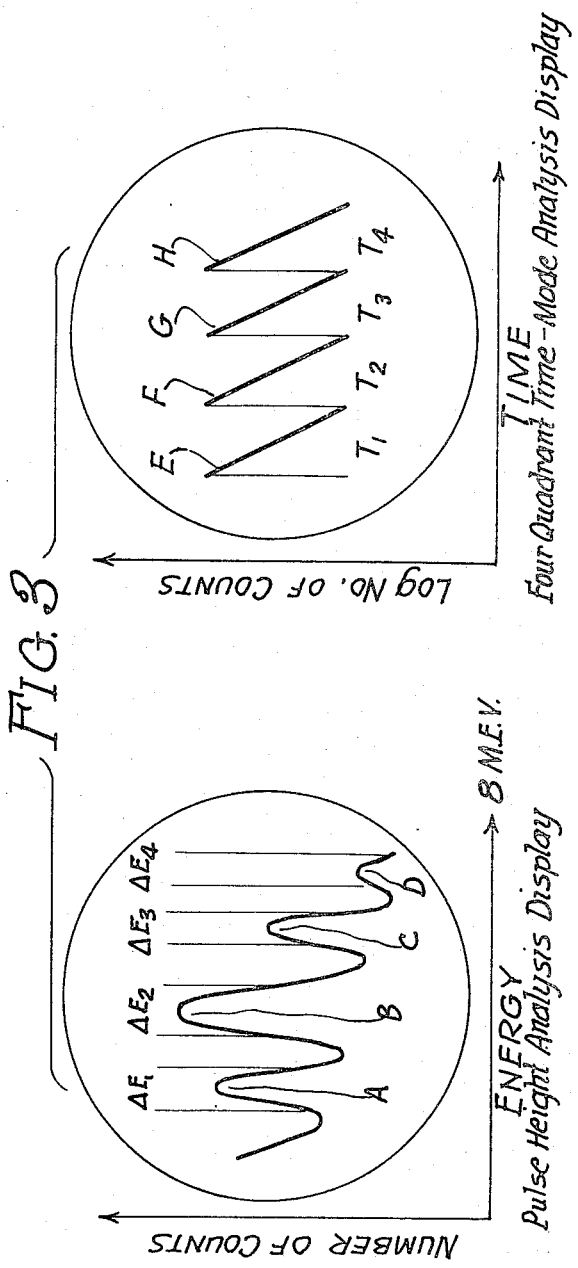
INVENTOR
Donald H. Frank
by Robert L. Slater, Jr.
Attys

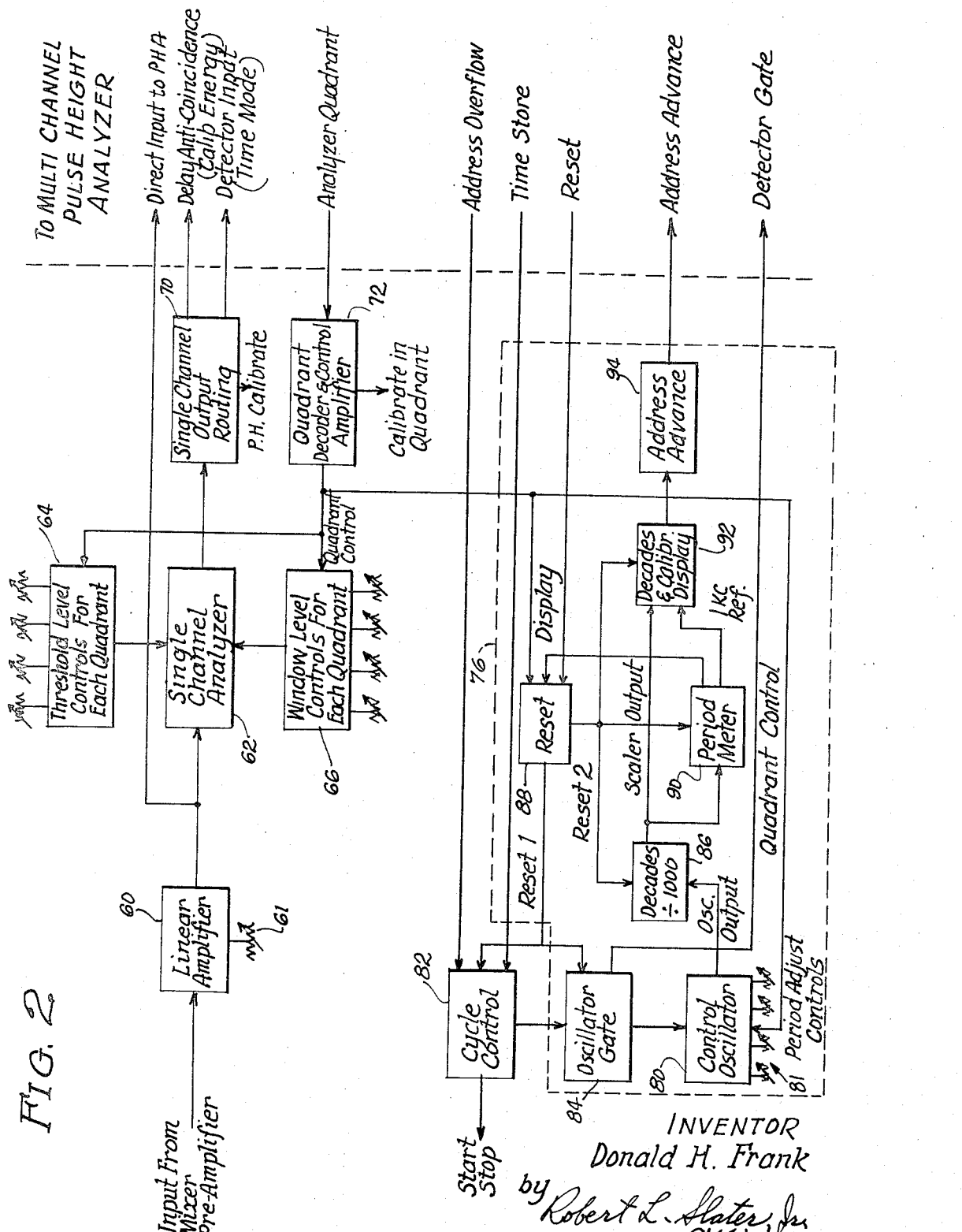

United States Patent Office 3,376,420
Patented Apr. 2, 1968

3,376,420
NEUTRON ACTIVATION SPECTROMETRY SYSTEM
Donald H. Frank, Skokie, Ill., assignor, by mesne assignments, to Nuclear-Chicago Corporation, formerly named Searle Nuclear Corporation, Des Plaines, Ill., a corporation of Delaware
Filed Aug. 10, 1964, Ser. No. 388,519
3 Claims. (Cl. 250—83.3)

The present invention relates generally to neutron activation spectrometry and more particularly, to an improved system for observing specific energy bands or regions of interest, lying within a selected portion of a complex energy distribution, as a function of time.

Neutron activation spectrometry, sometimes referred to as neutron activation analysis, depends substantially on the fact that when a material is subject to bombardment by irradiation or activation with a high energy stream of nuclear particles, the irradiated atoms of the material are caused to be radioactive. The high energy nuclear particles utilized in the irradiation process may be derived from a neutron generator. When the atoms of the irradiated material are caused to be radioactive, they disintegrate and in doing so, emit high energy electromagnetic radiations or gamma rays. The radioactive isotope of each atom thus formed will have a characteristic half life and gamma ray energy. In other words, each atom will have a characteristic radioactive signature or fingerprint which is unique. Upon counting the rate of gamma rays emitted by an irradiated sample over a given time, the half lives of the radioactive nuclei can be determined and by further measuring the energy content of the gamma rays, the isotopes undergoing radioactive decay can be positively identified.

The foregoing analysis procedure results in a gamma ray spectrum of the neutron activated material. Typically, such a spectrum is evaluated by determining the number of gamma rays emitted for various energy values. Thus, a graphical representation of a gamma ray spectrum would plot the intensity or number of gamma rays emitted along the $y$ axis or ordinate, and the energy distribution in millions of electron volts (mev.) along the $x$ axis or abscissa. A graph or spectrum plotted as described will be unique for each isotope in the material undergoing analysis. It should be noted that the spectrum of each isotope is independent of that isotope's chemical combination and, therefore, a chemical compound undergoing analysis will result in a series of overlapping spectra, each representing the individual isotope signatures of the chemical elements comprising the compound.

In order to more fully appreciate the scope and purpose of the present invention, it will be helpful to examine briefly the earlier technology of radioactive spectrum counting, measuring, analysis and display. When a sample material has been rendered radioactive by bombardment with neutrons, analysis of its radioactive decay energy spectrum can immediately begin. The irradiated sample will emit gamma rays at a decaying rate which will have various intensities or energies derived from the various isotopes formed in the sample. If the irradiated sample is placed in the vicinity of a scintillation crystal, a brief flash of light or scintillation will be emitted each time a gamma ray passes therethrough. The scintillating crystal is a proportional device wherein the intensity or brightness of each light flash is proportional to the energy content of the gamma ray which produces it. By means of a sensitive photomultiplier tube juxtaposed to the scintillation crystal, the light flashes or scintillations which occur in the crystal are translated into electrical pulse signals, each of which is proportional to one gamma energy quantum. Each electrical data pulse signal will thus have a voltage amplitude corresponding to the energy content of the gamma ray emission or event being observed. As the activated atoms decay, the number of pulses per unit time will decrease and thus, the counting rate will decrease.

During a typical activation analysis procedure, many thousands of pulses of varying amplitudes will be produced during each second. In order to sort the pulses and prepare a spectrum display therefrom as described above, a multichannel pulse height analyzer, hereinafter referred to as an MCPHA for purposes of convenience, is frequently used. The MCPHA operated in the pulse height analysis mode sorts data pulses into a plurality of channels, each channel corresponding to a defined range of energy levels. For example, an MCPHA can be adjusted to analyze a train of pulses corresponding to gamma ray energies covering a range of 20 million electron volts (mev.). In an MCPHA having 400 channels, each channel would be adjusted to store pulses falling within a selected unique 50 kev. range. Thus, each channel in the MCPHA can store pulses corresponding to a given region or "slice" of energies. After a specified period of time, the number of counts in each channel will correspond to the number of gamma ray events which have occurred during the observed time having an energy value falling within the range of the channel window setting. Typical MCPHA have 400 or more channels into which pulses of varying energy ranges may be classified.

If, however, one is interested in observing only the number of counts associated with one defined range of amplitudes, a single channel analyzer, hereinafter referred to as an SCA for purposes of convenience, may be used. The SCA is in effect a voltage discriminator which selects those pulses which lie above a minimum "threshold" peak voltage or below a maximum or "window" voltage. An SCA feeds the selected pulses through the system to scalers, memory counters, or other pulse data processing devices.

Once the counts have been sorted and stored, the MCPHA may be used to display the stored data by means of an oscilloscope attachment. The MCPHA oscilloscope display is programmed to display as a series of steps, each step corresponding to a particular energy level or channel, the data stored in the MCPHA memory. Thus, the steps on the horizontal axis of the oscilloscope face can be made to correspond to successive energy level channels in the MCPHA memory while the vertical axis positions correspond to the number of counts in a particular channel. The resulting visual display or graph is then the pulse height analysis energy spectrum of the sample being observed.

The aforedescribed MCPHA pulse height analysis mode of operation represents only one of the many modes of operation which may be programmed in MCPHA equipment. There is yet another mode of operation which results in a different form of plot or graph that is the time mode of operation. The time mode utilizes each channel in an MCPHA as a separate memory location in which to store a plurality of incoming pulses or counts. For example, in an MCPHA which is presently commercially available, there are 400 such channels or memory locations provided. Each of these memory channels or memory addresses can be considered as a scaler having a capacity of $1 \times 10^6$ counts. Operating in combination with the memory locations is an address shifting or stepping system which enables the memory to accumulate or store counts or pulses in any of the 400 channels for a given period of time. For example, in the time mode method of operation each of the 400 channels can be opened to accept or accumulate pulse counts for a given period of time after which that channel is closed and the computer addresses incoming counts to the next adjacent channel. In this manner the 400 channels can each accept counts totalling $1 \times 10^6$ until all of the channels are filled or until the operator has decided that the necessary number of counts required to generate the desired display have been entered. After the counts have been accumulated in the memory addresses, they may be read out by means of an appropriate readout conversion system which operates by converting the integral number stored in each channel to a proportionate voltage which may be applied to one axis of a cathode ray tube. The other axis of the cathode ray tube has applied thereto a voltage proportional to the channel which is being read out at that particular time. Thus, a display in the time mode method of operation could result in a series of steps on the cathode ray tube, the horizontal axis of which corresponds sequentially to the number of channels having data stored therein, the vertical axis corresponding to the number of counts or pulses accumulated in each channel.

Two characteristics of the analysis and display from an irradiated sample are important for identifying the constituent isotopes comprising the sample: First, the energy distribution of the spectral lines corresponding to significant energy peaks on the display, and second, the decay or slope of each line from which the half life of each energy peak can be calculated. The energy distribution analysis display can be obtained by operating an MCPHA in the pulse height analysis mode as aforedescribed. By calibration of the horizontal axis on the graphical display the energy associated with each gamma ray peak can be determined. The slope of the decay curve of a selected energy peak can be found by a time mode analysis and graphical display.

For purposes of illustration, it can be assumed that four regions of interest or energy peaks have been identified in a pulse height analysis or energy distribution spectrum. It is then useful to program a time mode method of analysis and display the resulting data by presenting a simultaneous display of the slopes corresponding to the number of counts in each channel accumulated in a given time for each significant energy region. Furthermore, since each energy peak may correspond to different decay time ranges, it is also desirable that each time analysis display line be associated with an independent horizontal time base. Thus, if four slopes are presented simultaneously on a single display, each slope might represent the counts stored in 100 of the 400 total channels, each 100 channel display taken over a different time base as well as through a different energy interval.

Utilizing prior art devices, including multiple channel and single channel pulse height analyzers, it has not been possible heretofore to achieve the aforedescribed multiple time base varying energy window time mode automatic sequential analysis and display.

It is, therefore, a primary object of this invention to provide an improved neutron activation spectrometry system.

It is another object of this invention to provide neutron activation analysis apparatus for rapidly determining the energy and time analysis of a complex activation spectrum.

It is a further object of this invention to provide a neutron activation analysis system which provides automatic programming of a multi-channel pulse height analyzer in combination with a single channel pulse height analyzer to effect energy and time analysis displays of relatively complex activation gamma ray spectra.

Still another object of this invention is to provide a multiscaler programmer for a neutron activation analysis system.

Another further object of this invention is to provide a multi-channel neutron activation spectrographic analysis system in which a complex gamma ray spectrum emanating from various isotopes in an irradiated sample may be broken down into a plurality of energy regions of interest, and wherein the regions of interest may be simultaneously expanded and displayed, yet each on an independent time base selected for optimum definition of the slope showing the time decay curve for each selected region of interest.

For the purpose of illustrating and explaining the novel features of this invention, I have provided in the accompanying drawings preferred embodiments thereof which, when taken into consideration with the following description and claims, should facilitate an understanding of my invention and the operation thereof and wherein, FIGURE 1 is a schematic diagram of a preferred embodiment of this invention;

FIGURE 2 is a schematic diagram illustrating a portion of the embodiment of my invention shown in FIGURE 1;

FIGURE 3 is a series of waveforms illustrating displays typically produced by use of my invention.

The neutron activation spectrometer illustrated diagrammatically in FIGURE 1 includes a neutron generator 20 which provides a gated source of high energy neutron bursts. The sample 12 is irradiated by the neutron burst and is then placed in operative relationship with radiation detection means 14 and 16 respectively, shown as a pair of scintillation detectors. The scintillation detectors 14 and 16 may be any one of the many types known in the art and typically each comprises a scintillating crystal in combination with a photomultiplier tube. The electrical pulse signals generated by the scintillation detectors are mixed and amplified in preamplifier means 30 and further amplified in a linear amplifier 32 which preserves the relative amplitudes of the various pulse signals. The linear amplifier 32 is connected to a single channel pulse height analyzer 40. While a scintillation detector is referred to by way of example, it will be appreciated that there are other types of detectors equally as well known for the purpose of producing output pulses proportional to the energy of the incident gamma ray and it is intended the invention be construed to cover the use of such equivalent detectors.

Single channel analyzer 40 is provided with means for adjusting its threshold level setting and window level setting to predetermined values. The threshold setting determines the lowest amplitude pulse signal that will be accepted by the SCA, while the window setting determines the highest amplitude pulse signal that will be accepted by the SCA. The predetermined threshold and window settings may be sequentially programmed by multiscaler programmer 44 which will be described below.

For any given setting of the threshold level and window level, the SCA will provide an output pulse signal in response to an input data pulse signal having an amplitude that falls within the desired and preset energy range. Therefore, predetermined settings will result in output signals from the SCA which represent radioactive events lying in a specific energy region of interest.

Output pulse signals from the SCA are fed to the input of an MCPHA 50 which is normally operated in the time mode. As previously described, the time mode permits pulse counts to be addressed and stored in each channel for a predetermined time interval after which counts are addressed and stored in the next adjacent channel until the program cycle has addressed or stepped through all of the available channels. Synchronous operation of the MCPHA and the window and threshold settings of the SCA is effected by means of synchronization gating signals derived from the multi-analyzer programmer 44 which, in turn, derives clock pulse signals from time base generator 48.

The MCPHA is programmed whereby the 400 channels provided by the analyzer are consecutively sequenced by the programmer into four groups of 100 channels each, hereinafter referred to as quadrants, each quadrant being separately adjustable in channel time width and each quadrant in turn being consecutively connected with the SCA. As previously described, separate window and threshold settings are selectable and automatically sequenced for each of the 100 channel quadrants. Thus, each quadrant can be set to store data selected from one of four energy regions of interest in the energy spectrum of the irradiated sample.

The MCPHA is provided with an oscilloscope display 52 and permanent data readout may be recorded by means of a printer 56. Although any of a variety of commercially available MCPHA may be used in my invention the specific embodiment illustrated herein is described with particular reference to the transistorized 400 channel pulse height analyzer model 34–12 manufactured by RIDL, Division of Nuclear-Chicago Corporation, and described in detail in operator manual FM–1002.

Referring now to FIGURE 2, there is illustrated in greater detail a preferred embodiment of the SCA, multi-scaler programmer and time base generator of my invention shown in FIGURE 1. Input data pulse signals derived from the mixer and preamplifier are simplified by linear amplifier 60 and fed to the input of the SCA 62. The linear amplifier 60 is equipped with a gain control 61 to enable setting the data pulse signal level to the acceptance range of the SCA. The SCA 62 is equipped with a plurality of threshold level controls 64 and window level controls 66. Both sets of controls are paired such that for each selected quadrant there will also be selected a corresponding pair of controls comprising a threshold level and a window level. The output from the SCA is fed to a routing circuit 70 which functions to provide pulse data into the proper input of the MCPHA for either storage and display or calibration. For purposes of storage and display the SCA output is routed to the time mode input or detector input of the MCPA. For calibration the SCA output is routed to the calibration energy input or the delay anti-coincidence input of the MCPHA. Details of the calibration procedure will be explained below.

Sequencing pulse signals are derived from the time base generator 76 which includes a control oscillator 80 equipped with a plurality of period adjust controls 81. Each period control enables a predetermined oscillator output frequency to be generated. The desired period adjust control is gated on by means of an oscillator gate 84 which derives gating commands from either a manually operated start-stop switch through cycle control 82 or from reset means 88 actuated by reset, address overflow, or time store commands generated by the MCPHA. The oscillator frequency is reduced to the desired address advance rate through decade scalers 86 and 92. The output from the decade scalers is fed through address advance gate 94 to the address advance input of the MCPHA.

Logic pulse signals are derived from the MCPHA indicating the quadrant in which the MCPHA is operating. These analyzer quadrant pulses are decoded by a quadrant decoder and control amplifier 72 which provides a quadrant control signal utilized in synchronously switching the SCA energy windows and the time base period adjust control.

Initially, the programmer opens the detector gate on the MCPHA and sequentially steps the MCPHA through the first 100 channels in the time mode of operation. The foregoing sequence occurs as the result of a series of channel address pulses derived from the address advance gate 94. On receipt of each channel address pulse, the MCPHA adds pulse count data derived from the SCA 62 to a register during the channel counting time period. In addition, the MCPHA writes back into the register the data that have been previously stored in that channel. Thus, during the time the contents of each channel are in the register, new data are added to what was previously stored until the next address advance pulse is received. Immediately thereupon, the contents of the register are entered into the memory location for that channel and the data from the next successive channel are entered into the register, whereupon in a like manner new pulse data are added to the contents of the new channel. Similarly, the sequence is repeated until all of the remaining channels in the quadrant have been addressed.

The pulses which are entered into the detector input of the MCPHA correspond to input energies lying within the energy region or window of the SCA 62 selected by the threshold adjust control 64 and the window adjust control 66. When the first 100 channel quadrant has been sequenced, a new time base for channel address sequence and counting time per channel as well as a new window in the SCA can be selected for the next 100 channel quadrant. In a similar manner, pre-selected and separately adjustable time bases and windows for the third and fourth 100 channel quadrants in the MCPHA can be programmed. It should be noted that only one SCA is required, although as described herein, four energy regions are amplified for observation. In each 100 channel scan, the SCA is suitably sequenced, by means of the logic on the quadrant control line, to shift its window and threshold settings to the pre-determined values.

The quadrant decoder 72 derives sequence commands from the address scalers in the MCPHA. At the start of the first channel in the first quadrant the address advance pulses generated by the time base control oscillator 80 and scalers 86 and 92 are fed through the address advance gate 94 to the MCPHA. At the same time the detector gate in the MCPHA is opened allowing acceptance of data pulse counts into the corresponding MCPHA data register for the first channel of the first quadrant. Each of the 100 channels in the first quadrant will be of the same time width and will store pulses of the same amplitude range selected by the window and threshold settings of the SCA.

When the address advance pulse train has sequenced through the first 100 channel quadrant the MCPHA advances to the second 100 channel quadrant. Simultaneously, the control oscillator is automatically switched by means of cycle control 82 and oscillator gate 84 to provide the time per channel selected for the second quadrant and the SCA 62 is automatically set to the pre-selected settings for threshold and window levels by means of adjust controls 64 and 66. The same sequence of events occurs when the MCPHA advances to the third and fourth quadrants.

At the end of channel 399 in the fourth quadrant the MCPHA generates an address overflow pulse which is utilized to close the detector gate, thus preventing entry of any further pulse data. In addition, the address overflow pulse stops the control oscillator by means of cycle control 82 and oscillator gate 84. The MCPHA is then reset to recycle through all 400 channels as aforedescribed upon receipt of a start pulse.

Calibration of the window and threshold levels is accomplished by operating the MCPHA in the pulse height analysis store mode. In this case energy pulse data from the linear amplifier 60 will be fed directly to the pulse height analysis input of the MCPHA and the output from the SCA will be fed to the delay anti-coincidence input. When operated in the foregoing manner, the energy range corresponding to the SCA window and threshold settings for the quadrant being calibrated will not be stored in the memory of the MCPHA. While the MCPHA is in the pulse height analysis store mode there will be observed a blank region on the oscilloscope display corresponding to the energy band determined by the threshold and window settings of the SCA. Furthermore, if a sample spectrum is being displayed, there will be a gap in the spectrum also corresponding to the foregoing energy band set by the SCA. The lower limit of the blank region or energy gap can be moved to any portion of the spectrum by changing the setting of the threshold adjust control. The width of the energy gap can be made to encompass any desired amount of the spectrum above the threshold by changing the setting of the window adjust control. Thus, the window and threshold levels for each quadrant can be set by observing the oscilloscope display of the full pulse height analysis spectrum assuring time mode sequential scan of the desired energy regions of interest.

In order to determine with accuracy the counting time per channel a precision counting interval or period meter calibration circuit 90 is also provided. A stable 10 kilocycle crystal controlled oscillator generates a train of 1000 cycle pulses by means of a frequency divider circuit. In the time base calibrate mode a gating circuit is opened by a pulse from the time base output signal corresponding to the address advance pulse. A scaler in the calibrate decades 92 counts and displays the number of 1 kc. pulses obtained from the period meter 90 until the gating circuit is closed by the next successive address advance pulse, thereby measuring the period between successive address advance pulses in 1 millisecond increments.

FIGURE 3 illustrates waveforms typical of the displays which result from the operation of my invention. The pulse height analysis display shows a spectrum having four significant energy peaks A, B, C, and D respectively. Although the horizontal or energy axis is shown encompassing a range from 0 to 8 m.e.v. it is understood that the range is widely adjustable and may be preset to accommodate various energy spans. The vertical axis displays the number of counts accumulated in each channel over the 8 m.e.v. range. A four quadrant time mode analysis display of the four selected energy regions of interest is shown wherein slopes E, F, G and H respectively, correspond to the four energy regions of interest selected for further study. Each of the slopes is shown as a straight line which may be achieved by plotting the logarithm of the number of counts per channel on the vertical axis, while a linear time base is applied to the horizontal axis. As aforedescribed, four different time base periods $T_1$, $T_2$, $T_3$, and $T_4$ respectively, are shown for each quadrant.

To further illustrate the application of my invention the energy spectrum which results from neutron activation analysis of fuming nitric acid will be described. In the following analysis four components will be selected for detailed study comprising O, N, F, and Fe. The reactions, radiations and half-lives associated with the foregoing elements are listed in the following table:

| Element | Isotope | Energies | Half-Life |
|---|---|---|---|
| $O^{16}$ (n,p) | $N^{16}$ | 6.1 and 7.1 m.e.v | 7.35 seconds. |
| $N^{14}$ (n,2n) | $N^{13}$ | 510 k.e.v. positron | 10 minutes. |
| $F^{19}$ (n,2n) | $F^{18}$ | do | 112 minutes. |
| $Fe^{56}$ (n,p) | $Mn^{56}$ | 7–1.81 m.e.v | 2.58 hours. |

It can be seen that two of the isotopes, specifically $N^{13}$ and $F^{18}$, have identical energies but different half-lives. The pulse height analysis spectrum can be displayed with an energy range of 8.0 m.e.v. on the MCPHA and three energy regions of interest can be calibrated in the SCA quadrants as aforedescribed by means of the threshold and window level controls. Four time bases for the quadrants are also preselected. In order to more clearly separate the data from $N^{13}$ and $F^{18}$, both of which have identical energies, the analysis period for $Mn^{56}$ can be interposed in the third quadrant thus allowing the $N^{13}$ activity to diminish before starting the $F^{18}$ measurement. The following table shows typical settings of the energy windows and time bases for the four quadrant cycle.

| Quadrant | Isotope | SCA Threshold Window Range | Time Base for 100 Channels | Time per Channel |
|---|---|---|---|---|
| 1 | $N^{16}(O^{16})$ | 5.5–8 m.e.v | 30 seconds | 0.3 seconds. |
| 2 | $N^{13}(N^{14})$ | 400–600 k.e.v | 20 minutes | 12 seconds. |
| 3 | $Mn^{56}(Fe^{56})$ | 1.5–2 m.e.v | 60 minutes | 36 seconds. |
| 4 | $F^{18}(F^{19})$ | 400–600 k.e.v | 4 hours | 2.4 minutes. |

Thus, in the first 100 channel quadrant the signal pulse data fed to the MCPHA will represent scintillations corresponding to radioactive events having energies lying in the range from 5.5 to 8.0 m.e.v. The time base for the first quadrant scan will encompass 30 seconds for the 100 channels, allowing pulses to be stored in each channel for 0.3 second. At the end of the first quadrant scan, the energy window of the SCA will be reset to the range from 400 to 600 k.e.v. and the time base will be reset to encompass 20 minutes for the second quadrant scan. In a like manner the energy window and time base will be automatically set to the values appropriate for the third and fourth quadrants. The slope of the line resulting from each quadrant scan represents the half-life of the particular isotope for each selected energy region of interest.

It should be noted that in the commercially available version of the aforementioned Model 34–12 analyzer, the memory is electronically separable into four independent sections (quadrants) of 100 channels each, However, it is intended to be within the scope of this invention to use two or more sections and not to be limited to "quadrants," as such, and to use more or fewer than 100 channels per section as the design of the multiple channel pulse height analyzer or needs of the researcher might dictate.

The above specification and drawings are not intended to limit the scope of my invention, but are merely for illustrative purposes. The scope of my invention is set forth below in the following claims:

I claim:

1. Apparatus for determining a plurality of energy regions of interest in time mode analysis neutron activation spectrometry comprising in combination, pulse data generating detection means responsive to relative radioactive energies, a voltage discriminator having a plurality of predetermined window and threshold levels, said pulses being fed through means from the detection means to the input of the voltage discriminator, a multiple channel pulse height analyzer having a memory with a plurality of electronically separable sections therein, each section having a plurality of data storage channels, said multiple channel pulse height analyzer adapted to perform time mode analysis of pulse data derived from the output of the voltage discriminator, and means for sequentially programming the voltage discriminator and multiple channel pulse height analyzer in synchronization to process and display said time mode analysis for each memory section over a plurality of automatically sequenced and predetermined time base intervals.

2. Apparatus for determining a plurality of energy regions of interest in time mode analysis neutron activation spectrometry comprising in combination, detection means responsive to relative radioactive energies, said detector being adapted to generate electrical pulse signals having amplitudes proportional to the radiation energies, a single channel pulse height analyzer having a plurality of predetermined window and threshold levels, said pulse signals being fed to the input of the single channel analyzer, a multiple channel pulse height analyzer having a memory with a plurality of electronically separable sections therein, each section having a plurality of data storage channels, said multiple channel pulse height analyzer adapted to perform time mode analysis and display of pulse data derived from the output of the single channel analyzer, a programmer connected to both said single channel analyzer and multiple channel analyzer, said programmer, including a time base generator for generating predetermined time base intervals for each memory section, being adapted to sequentially switch the single channel analyzer and multiple channel analyzer in synchronization, whereby said time mode analysis is processed and displayed over a plurality of automatically sequenced and predetermined energy windows and time base intervals.

3. Apparatus for neutron activation spectrometry comprising in combination means for producing a beam of high energy neutrons, means for directing said neutrons onto a sample target to cause the formation of a plurality of short-lived radioactive isotopes in said sample, detection means responsive to the relative energies in the radioactive sample, said detection means being adapted to generate a train of electrical data pulses, the amplitudes of which are proportioned to the energies of the various radioactive isotopes undergoing decay, means for directing the data pulses into a voltage discriminator having an adjustable upper voltage threshold window and an adjustable lower voltage threshold, the voltage discriminator being adapted to produce an output data pulse signal only in response to pulses having an energy range in the region between the upper and lower threshold settings, a multiple channel pulse height analyzer having means for time mode analysis, including means for storing incoming pulses in a plurality of groups of separate storage channels; means for coupling data pulse signals from said voltage discriminator to said multiple channel pulse height analyzer, and programmer means, including a time base generator for generating predetermined time base intervals for each memory group, for switching said upper and lower threshold settings in synchronism with switching of time base intervals corresponding to each of said desired groups of storage channels within the pulse height analyzer, whereby data pulse signals having particular energy levels are accumulated in predetermined groups of storage channels for a preselected time interval after which the threshold settings may repeatedly be changed and the storage address repeatedly advanced to accumulate further data pulse signals representing selected energy regions of interest until said selector has advanced through the available groups of storage addresses.

References Cited

UNITED STATES PATENTS 3,114,835　12/1963　Packard _____ 250—71.5

RALPH G. NILSON, *Primary Examiner.*

A. B. CROFT, *Assistant Examiner.*